United States Patent [19]

Avins

[11] 4,084,672
[45] Apr. 18, 1978

[54] AUTOMATIC CONTROL OF FREE WHEELING

[75] Inventor: Jack Avins, Princeton, N.J.

[73] Assignee: RCA Corporation, New York, N.Y.

[21] Appl. No.: 644,157

[22] Filed: Dec. 24, 1975

[51] Int. Cl.² .............................................. B60K 29/00
[52] U.S. Cl. .................. 192/.055; 192/13 R; 192/.07
[58] Field of Search .................. 192/.055, 4 A, 13 R, 192/.044, .07, 47, 3 G, 3 R

[56] References Cited

U.S. PATENT DOCUMENTS

| 1,943,534 | 1/1934 | Koulichkov et al. | 192/.055 |
| 1,996,282 | 4/1935 | Drabin et al. | 192/.055 |
| 2,005,745 | 6/1935 | Hull | 192/3 R |
| 2,032,504 | 3/1936 | Schweering | 192/.055 |
| 2,065,980 | 12/1936 | Maybach | 192/.055 |
| 2,067,793 | 1/1937 | Seibold | 192/.055 X |
| 2,069,818 | 2/1937 | Cotterman | 192/13 R X |
| 2,080,196 | 5/1937 | Bowen | 192/13 R |
| 2,115,878 | 5/1938 | Rodman | 192/3 G |
| 2,210,237 | 8/1940 | Fuhrer | 192/4 A X |
| 2,227,412 | 12/1940 | Stortz | 192/.055 X |
| 2,260,759 | 10/1941 | Surdy | 192/4 A |
| 3,381,771 | 5/1968 | Granger et al. | 192/3 G |

Primary Examiner—Benjamin W. Wyche
Attorney, Agent, or Firm—H. Christoffersen; Samuel Cohen; Carl V. Olson

[57] ABSTRACT

An automobile is constructed so that switching between free wheeling and direct drive is accomplished automatically, using normal driver reflexes, by causing free wheeling to be initiated (or continued) whenever the automobile is accelerated, and direct drive to be initiated (or continued) whenever the automobile is braked.

1 Claim, 1 Drawing Figure

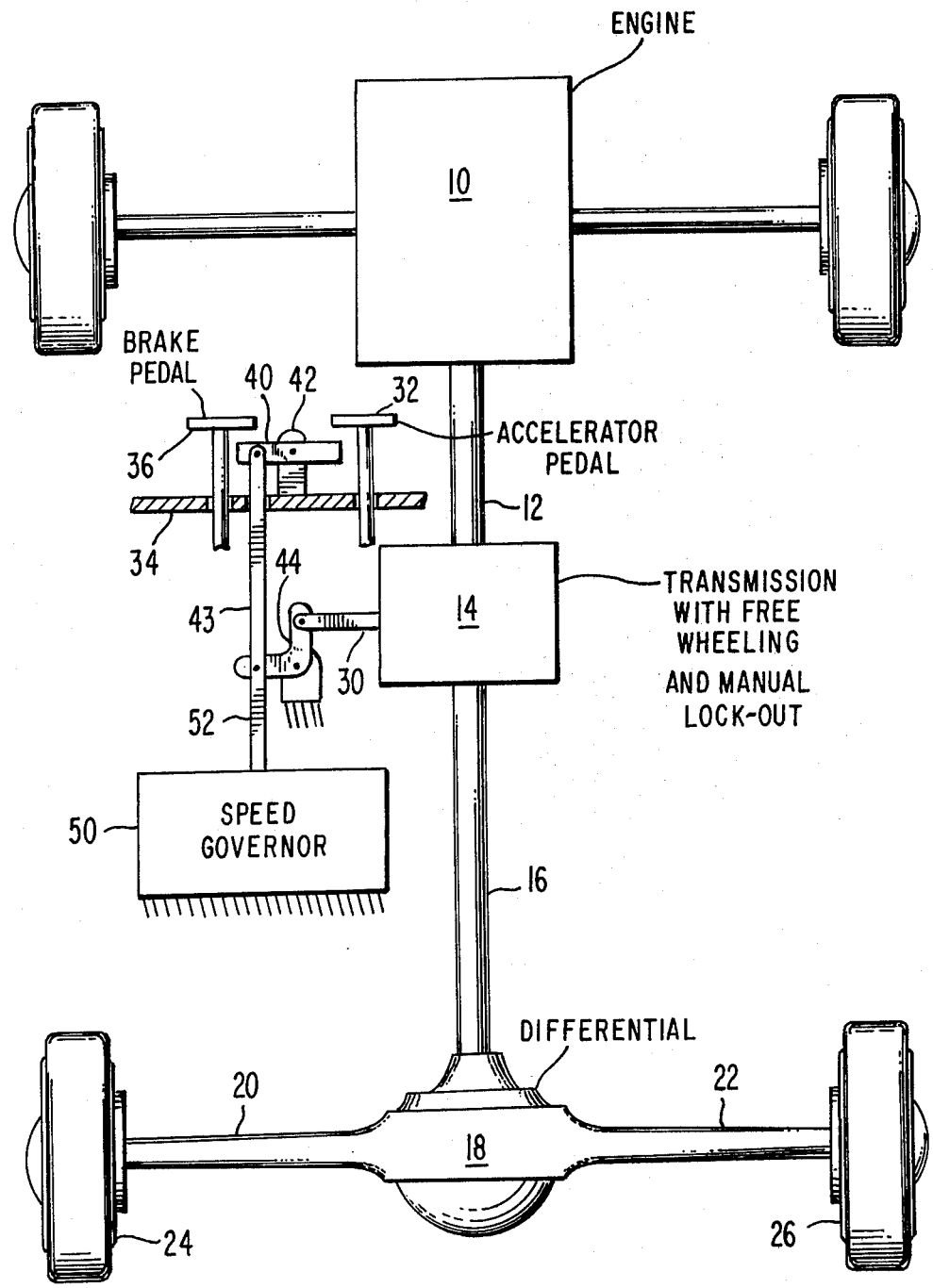

AUTOMATIC CONTROL OF FREE WHEELING

BACKGROUND OF THE INVENTION

Free wheeling is a term applied to an automobile transmission constructed so that the engine drives the wheels, but the wheels cannot drive the engine. The free wheeling feature for automobiles was actively proposed in the 1930's, but has not been accepted by the public because it takes away a desired braking effect of the engine when slowing down. Because free wheeling is desirable under certain operating conditions and is undesirable under other operating conditions, systems were proposed to provide a lever convenient to the automobile operator by which he could select to operate either under the free wheeling mode or the direct drive mode. Such manually controllable arrangements are described in the following U.S. Patents Nos.

1,967,539 — July 24, 1934 — Roos "Freewheeling Device"

2,034,335 — March 17, 1936 — Fisher "Control Mechanism"

2,064,230 — Dec. 15, 1936 — Starr "Freewheeling Mechanism"

2,144,160 — Jan. 17, 1939 — Kolb "Auto Clutch Mechanism"

However, automobile drivers apparently have not been willing to be bothered by another lever requiring their attention in order to have the advantages of free wheeling without its disadvantages.

SUMMARY OF THE INVENTION

Switching between free wheeling and direct drive in an automobile or other engine driven vehicle, is accomplished automatically, using normal driver reflexes, by causing free wheeling to be initiated (or continued) whenever the vehicle is accelerated, and direct drive to be initiated (or continued) whenever the vehicle is braked.

BRIEF DESCRIPTION OF THE DRAWING

The sole FIGURE of the drawing shows an automobile in which acceleration and braking, respectively, control the initiation and discontinuance of free wheeling.

DESCRIPTION OF PREFERRED EMBODIMENT

The drawing shows an automobile engine 10 having a drive shaft 12 connected through a transmission 14, a propeller shaft 16, a differential 18, and axles 20 and 22 to wheels 24 and 26. The transmission 14 includes a free wheeling unit providing either free wheeling operation, or direct drive operation, under control of a control rod or cable 30, and may be constructed according to any one of the above-listed prior art patents. For example, the free wheeling unit in transmission 14 and the control rod 30 therefor may be the "free wheeling clutch" and control cable 61 in the Fisher patent, or the "free wheeling mechanism" and control rod 68 in the Starr patent, or the "free wheeling unit" and control arm 47 in the Roos patent. The transmission 14 is preferably an automobile transmission providing automatic gear shifting.

The automobile includes an accelerator pedal 32, having a stem extending downwards through a hole in a floorboard 34. There is also a brake pedal 36, having a stem extending downwards through a hole in the floorboard 34. The stems are connected to appropriate carburetor and brake means, respectively, (not shown).

A rocker arm 40 is pivotally mounted on a support 42 at a position where one end of the rocker arm is engaged when the accelerator pedal 32 is depressed, and the other end of the rocker arm is engaged when the brake pedal 36 is depressed. At a point on the rocker arm 40, displaced from the pivoted mounting on support 42, there is attached one end of a control rod or cable 43, which acts through rocker arm linkage 44 and rod 30 to control engagement or disengagement (lockout) of free wheeling in transmission 14.

The automobile may include a conventional speed governor apparatus 50 including means to sense whether the speed of the vehicle is above or below a preset value, and to cause a deceleration of the automobile when the speed is above the preset speed, and to cause an acceleration of the automobile when the speed is below the preset speed, by a linkage (not shown) to the carburetor means. In addition, the speed governor 50 is provided with an output linkage 52, through the crank arm 44 and the control rod 30, to control the engagement and disengagement of free wheeling in transmission 14. When the speed governor 50 is engaged by a linkage (not shown), it also acts on transmission 14 to cause free wheeling operation. Free wheeling then, continues until the brake pedal is depressed, which action restores direct drive and disengages the speed governor.

OPERATION

In the operation of the motor vehicle equipped as shown in the drawing, depressing the accelerator pedal 32 causes an increased fuel supply to the engine by means not shown, and also causes an initiation of the free wheeling mode of operation if not already in operation. Therefore, whenever foot pressure on the accelerator is removed, the auto coasts and provides the gasoline economy of free wheeling.

Later, depression of the brake pedal 36 acts on the brakes (not shown), to slow the vehicle, and also acts to initiate a lock-out of the free wheeling, and provide direct drive operation, if not already in operation. Thereafter, the braking effect of the engine serves to reduce the amount of braking required to be produced by the vehicle brakes.

It is, therefore, apparent that the described apparatus operates automatically and without intervention by the driver to provide the advantages of free wheeling during normal driving, and to provide the advantages of a direct drive when it is desired to slow down the vehicle.

What is claimed is:

1. In a motor vehicle having a brake pedal and an accelerator pedal, and having a power transmission means including a free wheeling unit and control means connected to said unit to cause direct drive or free wheeling operation, the combination of:

means responsive to depression of the brake pedal to actuate said control means to provide direct drive operation, and means responsive to depression of the accelerator pedal to actuate said control means to provide free wheeling operation.

* * * * *